United States Patent
Attarwala et al.

(10) Patent No.: US 7,250,466 B2
(45) Date of Patent: *Jul. 31, 2007

(54) RAPID CURING ANAEROBIC COMPOSITIONS

(75) Inventors: Shabbir Attarwala, Simsbury, CT (US); Dzu D. Luong, West Hartford, CT (US); Alan E. Litke, Waterbury, CT (US); Victor K. Kadziela, New Britain, CT (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/432,199

(22) PCT Filed: Sep. 21, 2001

(86) PCT No.: PCT/US01/29680

§ 371 (c)(1),
(2), (4) Date: May 11, 2005

(87) PCT Pub. No.: WO02/26861

PCT Pub. Date: Apr. 4, 2002

(65) Prior Publication Data
US 2005/0239952 A1 Oct. 27, 2005

Related U.S. Application Data

(60) Provisional application No. 60/235,076, filed on Sep. 25, 2000.

(51) Int. Cl.
C08F 20/10 (2006.01)

(52) U.S. Cl. .................. 524/556; 525/330.3; 526/518; 526/303.1

(58) Field of Classification Search ................ 521/82, 521/89; 523/113, 115, 116, 122; 524/556; 525/453, 330.3; 526/27, 176, 262, 303, 318, 526/303.1

See application file for complete search history.

(56) References Cited

U.S. PATENT DOCUMENTS

| | | | | |
|---|---|---|---|---|
| 2,895,950 A | * | 7/1959 | Krieble | 526/323.1 |
| 3,547,851 A | * | 12/1970 | Frauenglass | 524/317 |
| 3,672,942 A | * | 6/1972 | Newmann | 427/295 |
| 3,969,552 A | * | 7/1976 | Malofsky et al. | 427/295 |
| 4,049,634 A | * | 9/1977 | Ko et al. | 528/296 |
| 4,314,924 A | * | 2/1982 | Haubennestel et al. | 524/779 |
| 4,447,563 A | * | 5/1984 | Kanaoka et al. | 523/176 |
| 4,604,295 A | * | 8/1986 | Humphreys | 427/519 |
| 4,632,945 A | * | 12/1986 | Garcia et al. | 523/176 |
| 4,722,969 A | * | 2/1988 | Huynh-Tran et al. | 525/123 |
| 4,916,184 A | * | 4/1990 | Clark | 525/27 |
| 4,920,188 A | * | 4/1990 | Sakashita et al. | 526/196 |
| 5,319,036 A | * | 6/1994 | DeMarco | 525/366 |
| 5,567,788 A | * | 10/1996 | Zezza | 526/334 |
| 5,834,532 A | * | 11/1998 | Yamamoto et al. | 523/118 |
| 6,043,327 A | * | 3/2000 | Attarwala et al. | 526/259 |
| 6,232,431 B1 | * | 5/2001 | Hosoki | 528/196 |
| 6,451,927 B1 | * | 9/2002 | Haas et al. | 525/426 |
| 6,673,875 B2 | * | 1/2004 | Attarwala et al. | 525/450 |
| 2002/0084021 A1 | * | 7/2002 | Holguin et al. | 156/234 |
| 2002/0111439 A1 | * | 8/2002 | Attarwala et al. | 525/426 |
| 2003/0036601 A1 | * | 2/2003 | Attarwala et al. | 524/561 |
| 2003/0171467 A1 | * | 9/2003 | Kneafsey et al. | 524/257 |
| 2005/0154141 A1 | * | 7/2005 | Attarwala et al. | 525/242 |

FOREIGN PATENT DOCUMENTS

WO  WO 00/25628  * 5/2000
WO  WO 200025628 A1 * 5/2000

OTHER PUBLICATIONS

King Industries Speciality Chemicals, Product Data Sheet "Disparlon 6100 & 6200", Kusumoto Chemicals, LTD., May 1998.*

* cited by examiner

Primary Examiner—David W. Wu
Assistant Examiner—Michael Bernshteyn
(74) Attorney, Agent, or Firm—Steven C. Bauman

(57) ABSTRACT

A curable composition having enhanced cure speed which includes a curable component, a cure system and an additive for enhancing cure speed. The additive includes an alkali metal halide salt and the reaction product of: (a) a polyfunctional isocyanate and a member selected from the group consisting of an hydroxy and an amine; or (b) a phosgene or phosgene derivative, and a compound having 3 to 7 polyethylene glycol ether units terminated at one end with an ether group and at the other end with a reactive functional group selected from the group consisting of an amine, an amide, a thiol and an alcohol; or (c) a monohydroxy compound, a diisocyanate and a polyamine. Alternatively, in place of or in combination with the cure speed enhancing additive, an aromatic substituted (meth)acryl functionalized component may be incorporated into the curable component to achieve enhanced cure speed.

12 Claims, No Drawings

RAPID CURING ANAEROBIC COMPOSITIONS

CROSS REFERENCE TO RELATED APPLICATIONS

This application is the U.S. National Phase of International Patent Application No. PCT/US2001/29680 filed Sep. 21, 2001, which claims the benefit of an earlier filing date under 35 U.S.C. § 120 from Provisional Application No. 60/235,076 filed Sep. 25, 2000.

BACKGROUND OF THE INVENTION

1. Field of the Invention

This invention relates to anaerobically curable compositions, their use and method of preparation. More particularly, this invention relates to anaerobically curable compositions which exhibit rapid curing irrespective of the type of surface, thereby rendering them surface-insensitive.

2. Brief Description of Related Technology

Anaerobic adhesive compositions are well known for their ability to remain in a liquid, unpolymerized state in the presence of oxygen and to cure to a solid state upon the exclusion of oxygen. Early work on anaerobic adhesive compositions concentrated on developing a cure system which improved the speed and/or bond strength of the adhesive composition. Various cure systems for anaerobic adhesive compositions have been developed to efficiently perform the redox reaction, which is the basis for anaerobic chemistry. Hydroperoxides were found to serve as a catalyst for the generation of a free radical. For example, U.S. Pat. No. 2,895,950 to Krieble, discloses the inclusion of hydroperoxides in amounts of 0.10 to 10% by weight in anaerobic adhesive compositions to achieve faster cure times. Amines, used in amounts up to about 10 percent by weight, are also disclosed in the '950 patent as accelerators to generate free radicals of the peroxide.

In many thread-locking applications, it is desirable for the composition to have a relatively low viscosity to permit penetration and wicking into the thread-engaging spaces. Viscosities which are too high to exhibit sufficient flow characteristics, may not sufficiently fill the voids in this area.

Many anaerobic threadlocking applications, such as in the electronics industry, require compositions which require relatively low strength to permit disassembly and replacement parts. Low strength anaerobic compositions, typically have less reactive monomer content than those anaerobic compositions where reaction products exhibit higher strength. As a result, the cure speed of low strength anaerobic compositions is slower than that of higher strength anaerobic compositions containing a greater level of reactive monomer component.

On surfaces, such as stainless steel, zinc, dichromate, and cadmium, which are considered "slow" or relatively inactive materials for anaerobic cure, primer compositions have been considered necessary for quick fixture and cure times required of many applications. The cure speed on these materials is significantly slower when compared to typical ferrous-containing surfaces, regardless of the reactive monomer content.

To enhance the cure speed of anaerobic compositions, and particularly low and medium strength threadlocking compositions, various surface preparations and primers have been used. While such primers are often very effective, their use requires the additional step of applying the primer with a certain degree of care to prevent migration and contamination of surrounding parts. This requires considerable attention in applications where small and/or sensitive components are involved. Additionally, many primers contain undesirable solvents which may be harmful to component parts and/or the surrounding environment.

Currently, the addition of viscosity modifiers, such as thickeners or fillers, are added to control the viscosity and curb the tendency of adhesive to migrate. This is usually accomplished, however, at the loss of a certain amount of cure strength, since the addition of viscosity modifiers usually replaces a portion of the reactive monomer component.

Other (meth)acrylate-based curable compositions have used a combination of uv curable components to achieve the desired cure properties. For example, Japanese Laid-Open Patent Publication Nos. 10-130601 and 10-130602 reportedly assigned to Nippon Kayakuco, Ltd., disclose uv curing adhesive compositions for use as protective coatings on optical discs which employ a uv curable ethylenically compound, such as a (meth)acrylate compound, a photoinitiator, an organic peroxide and an amino accelerator compound. Among the disclosed curable compounds are 2-hydroxyethyl (meth)acrylate, benzyl (meth)acrylate, isobornyl (meth)acrylate and phenyl oxyethyl (meth)acrylate. Another example of a uv curing (meth)acrylate-based composition is disclosed in U.S. Pat. No. 5,908,873, which contains an aliphatic urethane acrylate oligomer, a reactive (meth)acrylate monomer, a release agent and a photoinitiator. This composition is used to affix coated and inked optical fibers in a ribbon configuration.

There is a need for curable compositions which can fulfill applications requiring a range of cure strengths, i.e., low to high strength, and cure more rapidly without the use of surface treatments, such as primers. There is also a need for a curable composition that can achieve rapid cure on inactive of surfaces and reach a high percentage of its final cure strength in a relatively short time.

SUMMARY OF THE INVENTION

The present invention provides curable compositions, such as anaerobic adhesive compositions, which exhibit enhanced cure speed due to the unique combination of components. Enhanced cure speed can be achieved even on surfaces considered inactive, such as non-ferrous surfaces. Additionally, the present invention provides compositions which can achieve enhanced cure speed without the need for surface preparations, such as primers. Compositions within the scope of the present invention have particular application as threadlockers and can be formulated into low, medium and high strength anaerobic threadlockers which are fast curing on inactive surfaces. In addition, compositions within the scope of the present invention have particular application as anaerobic impregnation sealants.

In one aspect of the invention, the inventive compositions include:

(a) a (meth)acryl functionalized curable component;
(b) a cure system therefor;
(c) an additive which includes an alkali metal cation and the reaction product of:
  (i) a polyfunctional isocyanate and a member selected from the group consisting of an hydroxy and an amine; or
  (ii) a phosgene or phosgene derivative, and a compound having 3 to 7 polyethylene glycol ether units terminated at one end with an ether group and the other end with a reactive functional group selected from the group consisting of an amine, an amide, a thiol and an alcohol; or (iii) a monohydroxy compound, a diisocyanate and a polyamine.

In another aspect of the present invention there is included a composition having enhanced cure speed which includes the aforementioned components, where at least a portion of the (meth)acryl functionalized curable component includes a phenoxy (meth)acrylate.

In yet another aspect of the present invention, there is included a composition having enhanced cure speed which includes:

(a) a (meth)acryl functionalized curable component, at least a portion of which includes an aromatic substituted (meth)acrylate; and (b) a cure system therefor.

The aromatic substituent may be selected from a wide variety of substituted and unsubstituted groups such as alkaryl, aryloxy, alkaryloxy and the like.

In still another aspect of the present invention, there is included in anaerobically curable composition which includes:

(a) a polyfunctional (meth)acrylate ester component;

(b) a peroxide; and (c) a cure speed accelerator which includes intermolecular polyethylene glycol ether oligomers coordinated with an alkali metal cation, where the composition exhibits increased cure speed and strength on substrates, and especially non-ferrous substrates, as compared to the same composition without the cure speed accelerator.

In still another aspect of the present invention, there is included a method of increasing the cure speed of a (meth)acryl functionalized monomer composition. This method includes incorporating into the composition an additive including an alkali metal cation and the reaction product of: (a) a polyfunctional isocyanate and a member selected from the group consisting of an hydroxy and an amine; or (b) a phosgene or phosgene derivative, and a compound having 3 to 7 polyethylene glycol ether units terminated at one end with an ether group and the other end with a reactive functional group selected from the group consisting of an amine, an amide, a thiol and an alcohol; or (c) a monohydroxy compound, a diisocyanate and a polyamine.

The invention will be further described below.

DETAILED DESCRIPTION OF THE INVENTION

The present invention provides compositions which can be cured anaerobically and which have particular usefulness as threadlockers. The curable component includes a polyfunctional (meth)acrylate ester monomer. Such monomers may be chosen from any of those commonly used in the art. For example, useful monomers include, without limitation, those corresponding to the following general formula:

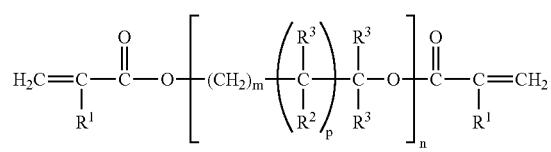

wherein $R^1$ is selected from hydrogen, halogen, and lower alkyl of 1-4 carbon atoms; $R^2$ is selected from the group consisting of hydrogen, —OH and

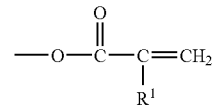

$R^3$ is a radical selected from hydrogen, lower alkyl of 1-4 carbon atoms and hydroxyalkyl of 1-4 carbon atoms; and m is an integer equal to at least 1, desirably from 1-20 and more desirably from 1 to 4; n is an integer equal to at least 1, desirably 1 to 20; and p is 0 or 1.

Typical of these monomers are mono-, di-, tri- tetra- and polyethylene glycol di(meth)acrylate and the corresponding diacrylates; di(pentamethylene glycol) di(meth)acrylate; tetraethylene glycol di(chloroacrylate); diglycerol diacrylate; diglycerol tetra(meth)acrylate; butylene glycol di(meth)acrylate; neopentyl glycol diacrylate; and trimethylpropane triacrylate.

Particularly useful polymerizable crosslinkable components are ethoxylated trimethylolpropane triacrylate, trimethylol propane tri(meth)acrylate, dipentaerythritol monohydroxypentacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylolpropane ethoxylate tri(meth)acrylate, glycerol propoxylate tri(meth)acrylate, trimethylolpropane tri(meth)acrylate, dipentaerythritol monohydroxy penta(meth)acrylate, tri(propylene glycol) di(meth)acrylate, neopentylglycol propoxylate di(meth)acrylate, 1,4-butanediol di(meth)acrylate, polyethyleneglycol di(meth)acrylate (PEGMA), triethyleneglycol di(meth)acrylate, butylene glycol di(meth)acrylate, ethoxylated bisphenol A di(meth)acrylate and combinations thereof.

Other useful monomers include those acrylates derived from bisphenol-A, such as bisphenol-A di(meth)acrylate, hydrogenated bisphenol-A di(meth)acrylate, and ethoxylated bisphenol-A di(meth)acrylate (EBIPMA).

While di- and other polyacrylate esters are used for producing a cross-linked product, monofunctional acrylate esters (esters containing one acrylate group) also may be additionally incorporated. These materials are often incorporated as reactive diluents which are capable of copolymerizing with the various other polymerizable materials. When dealing with monofunctional acrylate esters, it is desirable to use an ester which has a relatively polar alcoholic moiety. Such materials are less volatile than low molecular weight alkyl esters and, more importantly, the polar group tends to provide intermolecular attraction during and after cure, thus producing more desirable cure properties, as well as a more durable sealant or adhesive. Particularly desirable are the polar groups selected from labile hydrogen, heterocyclic ring, hydroxy, amino, cyano, and halogen polar groups. Useful examples of compounds within this category include cyclohexyl (meth)acrylate, tetrahydrofurfuryl (meth)acrylate, hydroxyethyl acrylate, hydroxypropyl (meth)acrylate, t-butylaminoethyl (meth)acrylate, cyanoethylacrylate, and chloroethyl (meth)acrylate. Other unsaturated reactive diluents, such as styrene and acrylonitrile, can also be used.

It is desirable that aromatic reactive diluents be incorporated into the composition. Certain aromatic reactive diluents have been formed to further promote the cure speed of the final compositions. (Meth)acryl functionalized components having an aromatic substituent have been found to enhance cure speed. In particular, phenoxy ethyl (meth) acrylate has been found to increase cure speed alone and in combination with the aforementioned inventive additive (c). Useful aromatic-containing reactive diluents include, without limitation, those compounds corresponding to the structure:

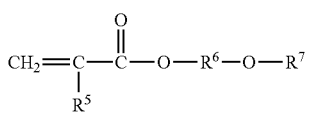

wherein $R^5$ may be H, $CH_3$, $CH_2CH_3$; $R^6$ may be $(CH_2)_n$, and n may be an integer from 1-4; $R^6$ may also be substituted with —OH or halide when n is 2-4; and $R^7$ may be a substituted or unsubstituted aromatic group such as phenyl, benzyl or a fused aromatic ring, such as napthalene, anthracene, and the like. $R^7$ may also be an alkaryl, alkaryloxy or aryloxy group.

The curable component is generally present in amounts sufficient to achieve the desired cure strength. This will depend, in part, on the intended application of the final product. Useful amounts may be in the range of about 10% to about 90% by weight of the total composition, and desirably about 20% to about 50% by weight. In instances where a portion of the curable component includes an aromatic substituted (meth)acryl component, the aromatic substituted (meth)acryl component may be present in amounts of about 0.5% to about 40% by weight of the total composition, and desireably in amounts of about 10% to about 30%.

The cure system used in the present invention may be chosen from a variety of materials useful for achieving cure. Anaerobically curable compositions typically employ a free radical initiator to serve as a free radical generating source which initiates free radical curing of the polymerizable monomer component. Accelerators may be employed to enhance the speed at which the peroxide free radical is generated. Reducing agents for the initiator, such as saccharin, may also be employed.

Free radical initiators such as peroxy, perester and peracid compounds may be employed. Illustrative of peroxy initiators are the diacyl peroxides such as benzoyl peroxide; dialkyl peroxides such as di-tert-butyl peroxide; ketone peroxides such as methylethyl ketone peroxide; and peresters which readily hydrolyze, e.g., tert-butyl peracetate, tert-butyl perbenzoate and di-tert-butyl diperphthalate. A particularly useful class of peroxy initiators are the organic hydroperoxides such as cumene hydroperoxide (CHP), methylethyl ketone hydroperoxide and tert-butyl hydroperoxide (TBH). Of these, cumene hydroperoxide is especially desirable. The initiators may be used in amounts of about 0.01% to about 10% by weight of the total composition, and desirably in amounts of about 0.1% to about 3% by weight of the total composition. Another useful class of initiators includes carbonyl-containing ultraviolet-activated free-radical generators, such as acetophenones, benzophenones and the benzoin ethers. Initiator combinations may also be employed.

Useful accelerators for the present invention include compounds having the following formula:

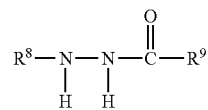

where $R^8$ is selected from alkyl from 2 to 6 carbon atoms, cycloalkyl, aryl, alkenyl, and cycloalkenyl and $R^9$ is selected from hydrogen, alkyl, cycloalkyl, alkenyl and cycloalkenyl, aryl, alkoxy, aryloxy, carbonyl, amino, and the following groups:

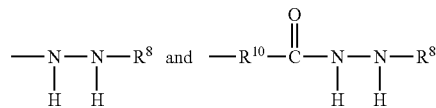

where $R^{10}$ is selected from alkyl groups containing one to about 10 carbon atoms, alkenyl groups containing two to about 10 carbon atoms, and aryl groups containing up to about 10 carbon atoms. Examples of useful accelerator compounds include 1-acetyl-2-phenyl hydrazine, 1-acetyl-2 (p-tolyl) para-toluene sulfonyl hydrazide, 1-formyl-2-phenyl hydrazine and combinations thereof.

Stabilizers and inhibitors may also be employed as well as chelating agents to control and prevent premature peroxide decomposition and polymerization. Among those useful inhibitors include phenols such as hydroquinone and quinones. Chelating agents may be used to remove trace amounts of metal contaminants. An example of a useful chelating agent is the tetrasodium salt of ethylenediamine tetraacetic acid (EDTA).

Other agents such as thickeners, plasticizers, fillers, elastomers, thermoplastics, and other well-known additives may be incorporated where functionally desirable.

In addition to a curable component and a cure system, the present invention includes an additive (c), which serves to control the rheology of the composition, as well as increase the composition's cure speed. As previously stated, the additive includes a combination of an alkali metal cation and the reaction product of (a) a polyfunctional isocyanate and a member selected from the group consisting of an hydroxy and an amine; or (b) a phosgene or phosgene derivative, and a compound having 3 to 7 polyethylene ether units terminated at one end with an ether group and at the other end with a reactive functional group selected from the group consisting of an amine, an amide, a thiol and an alcohol; or (c) a monohydroxy compound, a diisocyanate and a polyamine. When the reaction product described in (c) is employed it is generally formed by first reacting a monohydroxy compound with a diisocyanate to form a monoisocyanate adduct, and subsequently reacting the monoisocyanate reaction product with a polyamine in the presence of an alkali metal salt and aprotic solvent, as described in U.S. Pat. No. 4,314,924, the disclosure of which is hereby expressly incorporated herein by reference. A commercially available version of the reaction product described in (c) is believed to be BYK-410, from BYK-Chemie, Wallingford, Conn. BYK-Chemie describes this reaction product as a urea urethane.

Useful isocyanates for forming the reaction product(s) of the additive include polyisocyanates such as phenyl diisocyanate, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclo-hexylmethane diisocyanate, 1,3-bis-(isocyanatomethyl) cyclohexane, cyclohexylene diisocyanate, tetrachlorophenylene diisocyanate, 2,6-diethyl-p-phenylenediisocyanate, and 3,5-diethyl-4,4'-diisocyanatodiphenylmethane. Still other polyisocyanates that may be used are polyisocyanates obtained by reacting polyamines containing terminal, primary and secondary amine groups or polyhydric alcohols, for example, the alkane, cycloalkane, alkene and cycloalkane polyols such as glycerol, ethylene glycol, bisphenol-A, 4,4'-dihydroxy-phenyldimethylmethane-substituted bisphenol-A, and the like, with an excess of any of the above-described isocyanates.

Useful alcohols for reacting with the polyisocyanates also include polyethyl glycol ethers having 3-7 ethylene oxide repeating units and one end terminated with an ether or an ester, polyether alcohols, polyester alcohols, as well as alcohols based on polybutadiene. The specific type of alcohol chosen and the molecular weight range can be varied to achieve the desired effect. Generally, monohydroxy compounds, straight or branched chain aliphatic or cyclic primary or secondary alcohols containing $C_{5-25}$, and alkoxylated derivatives of these monohydroxy compounds are useful.

Phosgene and phosgene derivatives, such as bischloroformates, may be used to make the reaction product of the additive (c). These compounds are reacted with a nitrogen-containing compound, such as an amine, an amide or a thiol to form the adduct. Phosgenes and phosgene derivatives may also be reacted with an alcohol to form the reaction product.

Amines which can be reacted with phosgene or phosgene derivatives to make the reaction product include those which conform to the general formula $R^{11}$—$NH_2$, where $R^{11}$ is aliphatic or aromatic. Desirable aliphatic amines include polyethylene glycol ether amines. Desirable aromatic amines include those having polyethylene glycol ether substitution on the aromatic ring.

For example, commercially available amines sold under the tradename JEFFAMINE by Huntsman Corporation, Houston, Tex., may be employed. Examples include JEFFAMINE D-230, JEFFAMINE D400, JEFFAMINE D-2000, JEFFAMINE T-403, JEFFAMINE ED-600, JEFFAMINE ED-900, JEFFAMINE ED-2001, JEFFAMINE EDR-148, JEFFAMINE XTJ-509, JEFFAMINE T-3000, JEFFAMINE T-5000, and combinations thereof.

The JEFFAMINE D series are diamine based products and may be represented by:

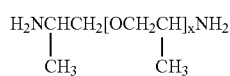

(CAS Registry No. 904610-0)

where x is about 2.6 (for JEFFAMINE D-230), 5.6 (for JEFFAMINE D-400) and 33.1 (for JEFFAMINE D-2000), respectively.

The JEFFAMINE T series are trifunctional amine products based on propylene oxide and may be represented by:

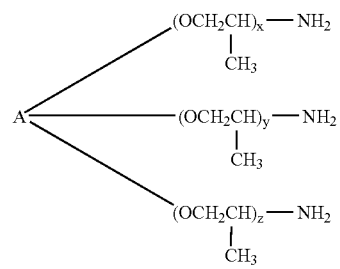

where x, y and z are set forth below in Table A.

TABLE A

| JEFFAMINE | | Approx. | Mole |
|---|---|---|---|
| Product | Initiator (A) | Mol. Wt. | PO |
| T-403 | Trimethylolpropane | 440 | 5–6 |
| T-3000 | Glycerine | 3,000 | 50 |
| T-5000 | Glycerine | 5,000 | 85 |

More specifically, the JEFFAMINE T-403 product is a trifunctional amine and may be represented by:

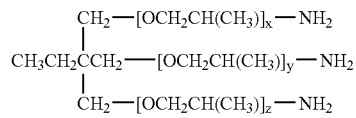

where x+y+z is 5.3.

(CAS Registry No. 39423-51-3)

The JEFFAMINE ED series are polyether diamine-based products and may be represented by:

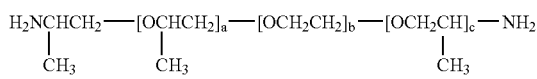

where a, b and c are set forth below in Table B.

TABLE B

| JEFFAMINE | Approx. Value | | Approx. |
|---|---|---|---|
| Product | B | a + c | Mol. Wt. |
| ED-600 | 8.5 | 2.5 | 600 |
| ED-900 | 15.5 | 2.5 | 900 |
| ED-2001 | 40.5 | 2.5 | 2,000 |

Amides useful for reacting with the phosgene or phosgene derivatives include those which correspond to the following formula:

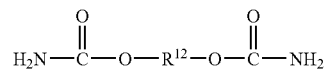

where $R^{12}$ may be an aliphatic or aromatic, substituted or unsubstituted, hydrocarbon or heterohydrocarbon, substituted or unsubstituted, having $C_{1-36}$.

Alcohols useful in forming the reaction product with the phosgene or phosgene derivatives include those described above.

The alkali metal cations are usually provided in the form of a halide salt. For example, sodium, potassium and lithium halide salts are useful. In particular, sodium chloride, sodium iodide, sodium bromide, potassium chloride, potassium iodide, potassium bromide, lithium chloride, lithium iodide, lithium bromide and combinations thereof may be employed.

The reaction products of additive (c) of the present invention are usually present in and added to the composition with an alkali metal salt, in a solvent carrier. The solvents are desirably polar aprotic solvents in which the reaction to form the reaction product was carried out. For example, N-methyl pyrrolidone, dimethylsulfoxide, hexamethylphosphoric acid triamide, N,N-dimethylformamide, N,N,N',N'-tetramethylurea, N,Ndimethylacetamide, N-butylpyrrolidone, tetrahydrofuran and diethylether may be employed.

One particularly desirable additive is the combination of a lithium salt and a reaction product which is formed by reacting a monohydroxy compound with a diisocyanate compound to form a mono-isocyanate first adduct, which is subsequently reacted with a polyamine in the presence of lithium chloride and 1-methy-2-pyrrolidone to form a second adduct. A commercially available additive of this sort is sold by BYK Chemie, Wallingford, Conn. under the trade name BYK 410. This commercially available additive is described by BYK-Chemie product literature as being a urea urethane having a minor amount of lithium chloride present in a 1-methyl-2 pyrrolidone solvent.

Desirably, the additive is present in the inventive compositions in amounts of about 0.1% to about 2.0% and more desirably in amounts of about 0.5% to about 0.7% by weight of the total composition.

Without wishing to be bound by any one theory, it is believed that the additive of the present invention allows for intermolecular attraction, which forms a loosely held network This network may temporarily be broken or disturbed, but quickly reforms due to intermolecular forces. It is believed that the alkali metal coordinates with polar groups on the reaction product(s) of the additive, thereby "lining-up" polar chains which are in proximity to each other. Such intermolecular alignment of the additive creates a network, which helps control the rheological properties of the compositions. Moreover, the alkali metal ions are believed to enhance cure speed.

Polymerization accelerators may also be included in the present composition. For example, organic imides (e.g., benzoic sulfimide) and primary, secondary or tertiary amines, and inhibitors or stabilizers of the quinone or hydroquinone families may be employed. The accelerators are generally employed in amounts of less than 10% by weight, and the inhibitors are conventionally employed in amounts of about 10 to about 1,000 parts per million (ppm). The anaerobic compositions of the present invention have the advantage of long-term stability and the ability to cure at room temperature upon the exclusion of oxygen, such as when placed between the mating threads of a nut and a bolt or between the juxtaposed surfaces of a bearing and a shaft. The anaerobic cure speed can be further enhanced by application of heat, e.g., up to about 150° C.

The compositions of the present may also include various additional components such as viscosity modifiers, pigments and coloring agents, plasticizers and the like in amounts suitable to achieve their intended purpose.

While described illustratively below in terms of threadlocking compositions, compositions within the scope of this invention may be employed as anaerobic sealants, a general description which may be found in U.S. Pat. No. 3,672,942 (Neumann); U.S. Pat. No. 3,969,552 (Malifsky); U.S. Pat. No. Re 32,240 (De Marco); and U.S. Pat. No. 4,632,945 (Garcia) the disclosures of which are hereby incorporated herein by reference.

EXAMPLES

Anaerobically curable threadlocking compositions, set forth below in Table I, were prepared. Composition A is a control and does not include the inventive additive. Compositions B-D are representative of an aspect of the inventive compositions which include the additive. Composition E is representative of inventive compositions which achieve enhanced cure speed by the inclusion of an aromatic substituted reactive (meth)acrylate (2-phenoxy methacrylate) along with the curable component without the additive. Composites F-I are representative of inventive compositions which employ both the additive and the aromatic substituted reactive (meth)acrylate. The compositions were tested for their cure speed, as measured by the threadlocking strength (breakloose/prevail [in.-lbs.]) developed on various metal substrates (nuts and bolts) at room temperature for a given cure time. The compositions were applied in equal amounts to the threads of the bolts and mated with the nut using a pretorque of 5 newton-meters (NM) (about 44 in.-lbs.). The compositions were allowed to cure at room temperature for 1 hour and 24 hours.

The results of these tests are shown below in Table II.

TABLE I

| COMPONENT | COMPOSITION (% by weight) | | | | | | | | |
| --- | --- | --- | --- | --- | --- | --- | --- | --- | --- |
| | A | B | C | D | E | F | G | H | I |
| PEGMA* | 69.05 | 69.55 | 68.05 | 67.55 | 39.05 | 38.55 | 39.03 | 38.05 | 37.55 |
| 2-phenoxy ethyl (meth)acrylate | 0.00 | 0.00 | 0.00 | 0.00 | 30.00 | 30.00 | 30.00 | 30.00 | 30.00 |

TABLE I-continued

| COMPONENT | COMPOSITION (% by weight) | | | | | | | | |
|---|---|---|---|---|---|---|---|---|---|
| | A | B | C | D | E | F | G | H | I |
| Additive** | 0.00 | 0.50 | 1.00 | 1.50 | 0.00 | 0.50 | 0.65 | 1.00 | 1.50 |
| Plasticizer | 23.00 | 23.00 | 23.00 | 23.00 | 23.00 | 23.00 | 23.00 | 23.00 | 23.00 |
| initiator reducing agent | 1.00 | 1.00 | 1.00 | 1.00 | 1.00 | 1.00 | 1.00 | 1.00 | 1.00 |
| Accelerator | 0.10 | 0.10 | 0.10 | 0.10 | 0.10 | 0.10 | 0.10 | 0.10 | 0.10 |
| free radical initiator | 1.00 | 1.00 | 1.00 | 1.00 | 1.00 | 1.00 | 1.00 | 1.00 | 1.00 |
| Stabilizers | 0.70 | 0.70 | 0.70 | 0.70 | 0.70 | 0.70 | 0.70 | 0.70 | 0.70 |
| Fillers | 5.00 | 5.00 | 5.00 | 5.00 | 5.00 | 5.00 | 5.00 | 5.00 | 5.00 |
| coloring agents | 0.15 | 0.15 | 0.15 | 0.15 | 0.15 | 0.15 | 0.15 | 0.15 | 0.15 |

*Poly(ethylene glycol)di(meth)acrylate
**Urea urethane and lithium chloride in 1-methyl-pyrrolidone solvent, commercially available as BYK-410 from BYK-Chemie, Wallingford, CT.

TABLE II

EFFECTS OF ADDITIVE ON
CURE STRENGTH IN 1 HR AND 24 HRS
(Breakloose/Prevail [in.-lbs.])

| COMPOSITION | 1 hr RTC | | | | 24 hr RTC | | | |
|---|---|---|---|---|---|---|---|---|
| | DgrdsStl | ReoilStl | Zinc | StnlssStl | DgrsdStl | ReoilStl | Zinc | StnlssStl |
| A* | 127/28 | 88/9 | 64/4 | 104/34 | 233/75 | 189/34 | 199/51 | 134/40 |
| B | 159/54 | 95/22 | 59/5 | 120/28 | 241/80 | 221/52 | 207/50 | 154/41 |
| C | 169/61 | 92/18 | 68/9 | 121/27 | 260/79 | 225/49 | 200/51 | 156/38 |
| D | 181/57 | 117/28 | 69/9 | 125/27 | 260/67 | 210/40 | 191/20 | 173/36 |
| E | 157/39 | 135/27 | 82/8 | 117/30 | 191/45 | 182/32 | 167/32 | 127/34 |
| F | 164/61 | 113/25 | 86/10 | 133/36 | 201/53 | 207/54 | 166/28 | 146/30 |
| H | 170/52 | 121/34 | 83/11 | 130/34 | 210/52 | 206/43 | 174/30 | 149/29 |
| I | 162/41 | 138/40 | 97/13 | 119/29 | 213/46 | 211/47 | 165/27 | 141/36 |

*Control
RTC stands for Room Temperature Cure
DgrdsStl stands for Degreased Steel
ReoilStl stands for Reoiled Steel
StnlssStl stands for Stainless Steel As indicated from the results in Table II, the inventive compositions B-D containing the additive showed significant cure speed improvement as measured by strength developed after 1 hour room temperature cure, when compared to composition A (control). The most significant strength measurement is breakloose, since this indicates the amount of torque (force) necessary to initially move the nut bonded to the bolt. In nearly every test, the amount of strength increased as the amount of additive increased, regardless of the type of metal substrate used. Similar results are seen when inventive compositions E, F, H and I are compared with composition A (control).

Additional anaerobically curable threadlocking compositions were prepared as set forth in Table III. These compositions included a combination of ethoxylated bisphenol A dimethacrylate and poly(ethylene glycol) dimethacrylate monomers. Composition J was a control and contained neither the additive nor an aromatic substituted methacrylate. Compositions K and L are representative of an aspect of the invention which employs aromatic-substituted methacrylates, i.e. 3-phenoxy-2-hydroxypropyl methacrylate and 2-phenoxy ethyl methacrylate, respectively, to enhance cure speed.

TABLE III

Threadlocker Compositions
(% by weight)

| Component | Composition | | |
|---|---|---|---|
| | J | K | L |
| Ethoxylated bisphenol A dimethacrylate | 47.05 | 47.05 | 47.05 |
| Poly(ethylene glycol) dimethacrylate | 30.00 | 0.00 | 0.00 |
| 3-phenoxy-2-hydroxypropyl methacrylate | 0.00 | 30.00 | 0.00 |
| 2-phenoxy ethyl methacrylate | 0.00 | 0.00 | 30.00 |
| Plasticizer | 15.00 | 15.00 | 15.00 |
| Initiator reducing agent | 1.00 | 1.00 | 1.00 |
| Accelerator | 0.10 | 0.10 | 0.10 |
| Free radical initiator | 1.00 | 1.00 | 1.00 |
| Stabilizer | 0.70 | 0.70 | 0.70 |
| Fillers | 5.00 | 5.00 | 5.00 |
| Coloring agents | 0.15 | 0.15 | 0.15 |
| Additive** | 0.00 | 0.00 | 0.00 |

**Without additive BYK 410, (Ure Urethane and lithium chloride in 4-methyl-Pynolidone)
J = Control The compositions were tested for their cure speed, as measured by the threadlocking strength (breakloose/prevail [in.-lbs.]) developed on various metal substrates (nuts and bolts) at room temperature for a given cure time. The compositions were applied in equal amounts to the threads of the bolds and mated with the nut using a pretorque of 5 newton-meters (NM) (about 44 in. -lbs.). The compositions were allowed to cure for 1 hour and 24 hours. The results are shown in Table IV.

TABLE IV

Effects of monomers on cure strength in 1 hr and 24 hrs (breakloose/Prevail [in.lbs])

| Composition | 1 hr RTC Br/Pv | | 24 hr RTC Br/Pv | | | |
|---|---|---|---|---|---|---|
| | Zinc | StnlssStl | DgrsdStl | ReoilStl | Zinc | StnlssStl |
| J | 59/2 | 60/11 | 318/173 | 225/176 | 170/140 | 90/112 |
| K | 53/2 | 71/30 | 357/173 | 226/181 | 210/119 | 120/114 |
| L | 68/2 | 54/3 | 305/147 | 268/158 | 183/122 | 98/81 |

When compared to Control J, inventive composition K demonstrated a significant increase in breakloose strength on stainless steel after 1 hr. room temperature cure, as well as higher breakloose strengths after 24 hour room temperature cure. Inventive composition L demonstrated a significant increase in breakloose strength on zinc after 1 hr. room temperature cure and comparable or enhanced overall breakloose strength after 24 hrs.

The examples set forth above serve to illustrate the present invention, but are in no way intended to limit the spirit and scope thereof, which are defined by the claims.

What is claimed is:

1. A curable composition comprising:
   (a) a (meth)acryl functionalized curable component;
   (b) a cure system for said curable component; and
   (c) an additive which comprises an alkali metal cation and the reaction product of a phosgene or phosgene derivative, and a compound having 3 to 7 polyethylene glycol ether units terminated at one end with an ether group and at the other end with a reactive functional group selected from the group consisting of an amine, an amide, a thiol and an alcohol.

2. The composition of claim 1 which cures under anaerobic conditions.

3. The composition of claim 2, wherein said cation is introduced as an alkali metal salt.

4. The composition of claim 3, wherein said alkali metal salt is an alkali metal halide.

5. The composition of claim 4, wherein said alkali metal salt is selected from the group consisting of lithium chloride, lithium iodide, lithium bromide, sodium chloride, sodium iodide, sodium bromide, potassium chloride, potassium bromide, potassium iodide and combinations thereof.

6. The composition of claim 1, wherein said cure system comprises a peroxy, perester or peracid.

7. The composition of claim 1, wherein said (meth)acryl functionalized curable component includes a reactive monomer having the structure:

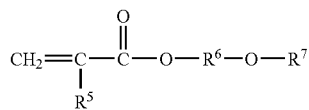

wherein $R^5$ may be H, $CH_3$ or $CH_2CH_3$; $R^6$ is $(CH_2)_n$, and n may be an integer from 1-4; $R^6$ may also be substituted with —OH or halide when n is 2-4; and $R^7$ may be a substituted or unsubstituted aromatic group.

8. The composition of claim 1, wherein said (meth)acryl functionalized curable component includes a phenoxy ethyl (meth)acrylate monomer.

9. The composition of claim 1, wherein said additive is in a solvent solution.

10. The composition of claim 9, wherein said solvent is selected from a group consisting of 1-methyl-2-pyrrolidone, tetrahydrofuran, diethylether, and combinations thereof.

11. The composition of claim 1, wherein said additive is present in amounts of about 0.1 to about 2.0% by weight of the total composition.

12. The composition of claim 1, wherein said composition is in the form of a threadlocker composition.

* * * * *